3,064,032
PROCESS FOR PREPARING HALOBORINANE COMPOUNDS
Gail H. Birum and James L. Dever, Dayton, Ohio, assignors to Monsanto Chemical Company, St. Louis, Mo., a corporation of Delaware
No Drawing. Filed June 15, 1959, Ser. No. 820,120
15 Claims. (Cl. 260—462)

The present invention relates to organic boron compounds and a method of making them.

Some organic boron compounds of the 2-halo-1,3,2-dioxaborinane type are known in the art. They have been prepared by reacting a boron trihalide such as boron tribromide or boron trichloride with an alkanediol, such as 1,3-propanediol. In this manner all of the boron in the 2-halo-1,3,2-dioxaborinane is supplied by the boron trihalide which is a relatively expensive chemical, and two-thirds of the halogen is lost as by-product hydrogen halide.

It is an object of this invention to provide an improved process and a more economical method of preparing borinane compounds. It is a further object of this invention to provide some new borinane compounds.

Our invention comprises a process for reacting a polyglycol diborate with a halogenating agent to produce 2-halo-1,3,2-dioxaborinanes, some of which are new compounds. This new process eliminates the need for as much as two-thirds of the boron trihalide that was formerly needed. The new compounds produced by this process are more stable to heat and resistant to decomposition than are the conventional haloborinanes.

Generally, our process of preparing haloborinanes comprises contacting a polyglycol diborate with a halogenating agent such as boron tribromide, boron trichloride, phosphorus pentabromide, phosphorus pentachloride, or some equivalent material, and recovering from the resulting reaction mixture the respective 2-bromo or 2-chloro-1,3,2-dioxaborinane according to the following scheme:

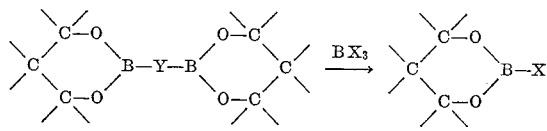

or

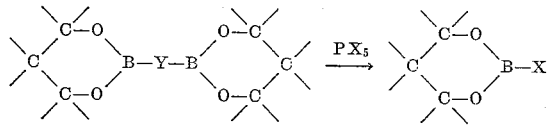

where —Y— is selected from the group consisting of —O— and

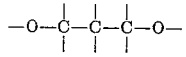

X is bromine or chlorine and the indicated free valences of the carbon atoms are satisfied by a member of the group consisting of hydrogen and alkyl radicals having 1 to 6 carbon atoms. The number of moles of haloborinane product produced per mole of polyglycol diborate and halogenating agent depends upon the definition of the —Y— constituent and upon the nature of the halogenating agent. If —Y— is —O— then the polyglycol diborate is a diglycol diborate, and there are obtained two moles of haloborinane as product and one mole of BOCl or POCl₃ as by-product, depending on which halogenating agent is used. When —Y— represents a

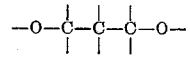

radical, then the polyglycol diborate is a triglycol diborate. When the triglycol diborate reacts with the phosphorus pentabromide or pentachloride, there are obtained two moles of haloborinane product and one mole of POCl₃ and one mole of dihaloalkane as by-products. The equimolecular reaction of the triglycol diborate with the boron tribromide or trichloride is a particularly advantageous variation of the process. In this case the boron atom that provides the halogen combines with the linear

group of the diborate by a cyclization mechanism. Thus, three moles of 2-halo-1,3,2-dioxaborinane are obtained per mole of triglycol diborate and of boron trihalide.

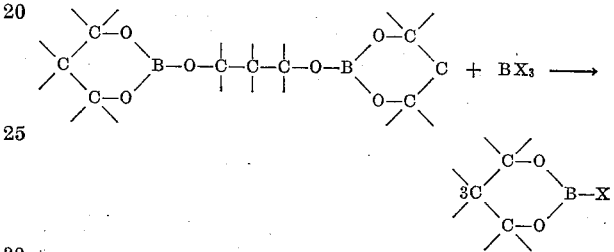

Since by-products are not produced by this preferred variation of the process, there is generally no need to distill or otherwise purify the product before use as a chemical intermediate.

The polyglycol diborate compound useful as a reactant in the instant process is usually prepared by treating with boric acid an alkanediol having the carbinol groups separated by one carbon atom. Depending upon the molar proportions of boric acid and alkanediol used, the reaction product is a diglycol diborate or a triglycol diborate, i.e., if the boric acid and alkanediol are contacted in equimolar proportions, the diglycol diborate will result; whereas if the boric acid and alkanediol are mixed in the molar ratio of two moles of boric acid to three moles of alkanediol, the triglycol diborate will result.

Examples of polyglycol diborate materials which may be used in this invention are the reaction products of boric acid and any of the following diols: 1,3-propanediol, 2-methyl-2-ethyl - 1,3 - propanediol, 2,2-dimethylpropanediol, 1,1,3-trimethyl-1,3-propanediol, 2-ethyl-1,3-hexanediol, 1,3-butanediol, 2-methyl-1,3-butanediol, 2,4-dimethyl-2,4-pentanediol, 2,3,3,4-tetramethyl - 2,4 - pentanediol, 2,2-dimethyl-1,3-butanediol, 2-butyl - 1,3 - propanediol, 3-cyclohexyl-1,3-butanediol, 1,3-hexanediol, 2-isopropyl-5-methyl - 1,3 - hexanediol, 2,4-hexanediol, 3-ethyl-2,4-hexanediol, 2,2-dibutyl-1,3-propanediol, 2,2-dipentyl-1,3-propanediol, 3-ethyl-3,5-undecanediol, 4-isopropyl-4,6-dodecanediol, 6-butyl-5,7-undecanediol, 3,4,4,5-tetraethyl-3,5-heptanediol.

The reaction between the polyglycol diborate and the halogenating agent can be made to take place at ordinary, decreased, or elevated temperatures. Advantageously, temperatures on the order of from —50° C. to 100° C. are used with —25° C. to 40° C. being preferred.

According to the method of this invention, it is preferred to use quantities of polyglycol diborate and halogenating agent which are close to stoichiometric to prevent undesired side reactions which might occur if too much halogenating agent were used. However, excess polyglycol diborate may be used without affecting the general course of the reaction. This excess may be left in the product in applications where its presence is not harmful. Excess polyglycol diborate may be separated from the chloroborinane by distillation when it is desirable.

The reaction between the polyglycol diborate and the halogenating agent is generally carried out in the absence of solvents or diluents. However, in some cases, e.g., when the polyglycol diborate is a solid, it may be advantageous to conduct the reaction in a non-reactive solvent, such as benzene, xylene, toluene, kerosene, carbon tetrachloride, and alkylene halides such as methylene chloride, and methylene bromide.

The new compounds prepared according to the present process are represented by the general formula

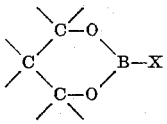

wherein at least two of the six indicated free valences on the three carbon atoms of the ring are satisfied by alkyl groups containing from 1 to 6 carbon atoms, those not being so satisfied being hydrogen, and X representing chlorine or bromine.

2 - chloro - 5,5 - dialkyl - 1,3,2 - dioxaborinanes of the formula

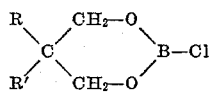

wherein R and R' represent alkyl groups containing 1 to 6 carbons each are examples. Also included are compounds such as 2 - bromo-4,5,6-trialkyl - 1,3,2 - dioxaborinanes with the formula

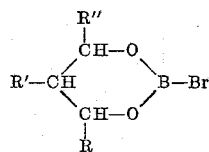

where R, R', and R'' represent alkyl groups containing 1 to 6 carbons each. Similarly, the generic formula definition includes compounds such as 2-bromo-4,4,6-trialkyl-1,3,2-dioxaborinanes with the structural formula

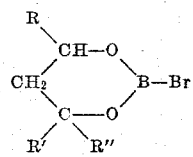

wherein R, R', and R'' have the same meaning as R, and R' above. The preferred compounds within the above general formula are those in which the substituents are in the 5-position, as in

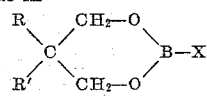

These compounds are more stable than compounds in which the substituents are either in the 4- or 6-position or in which there is no substitution.

For example, the 2-chloro-5-methyl-5-ethyl-1,3-2-dioxaborinane was found to be still in good condition and readily reactive 72 hours after preparation whereas the simple 2-chloro-1,3,2-dioxaborinane compound decomposed to such an extent that it could not be accurately analyzed or used when it was allowed to stand for 8 hours under the same conditions as the 2-chloro-5-methyl-5-ethyl - 1,3,2 - dioxaborinane. However, compounds in which the substituents are on the 4- and 6-positions of the ring are intended to be covered as indicated above. Specific examples of novel compounds encompassed by this invention are 2-chloro - 5,5 - dimethyl - 1,3,2 - dioxaborinane, 2-chloro-5-methyl-5-ethyl-1,3,2 - dioxaborinane, 2-chloro-4,5,6-trimethyl - 1,3,2 - dioxaborinane, 2-chloro-4,4,6 - trimethyl - 1,3,2-dioxaborinane, 2-chloro-5,5-dipropyl-1,3,2-dioxaborinane, 2-chloro-5,5-dibutyl-1,3,2-dioxaborinane, 2-chloro-5,5-dipentyl - 1,3,2 - dioxaborinane, 2-chloro-5,5-dihexyl-1,3,2-dioxaborinane, 2-chloro-5-propyl-5-butyl - 1,3,2 - dioxaborinane, 2-chloro-5-tert-butyl-1,3,2-dioxaborinane, 2-chloro-4-hexyl-4,6-diethyl - 1,3,2-dioxaborinane, 2-chloro-4,4-diisopropyl-6-pentyl - 1,3,2 - dioxaborinane, 2-chloro-4,5,6-tributyl-1,3,2-dioxaborinane, and 2-chloro-4,4,5,5,6,6-hexaethyl-1,3,2-dioxaborinane. It is understood that bromine may be substituted for chlorine in the above given formulas.

The 2-halo-1,3,2-dioxaborinane compounds of this invention are useful as fire retardant additives for polymers, resins, natural and synthetic fibers, textiles, surface coatings, etc. These new compounds are particularly useful in making phosphorus-containing esters of boron acids by reacting the substituted 2-halo-1,3,2-dioxaborinanes of this invention with a carbonylic compound, and a triorgano phosphite, phosphonite, or phosphinite according to the reaction

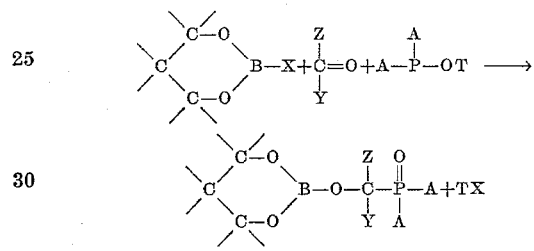

wherein at least two of the six indicated free valences on the carbon atoms in the ring of the 2-haloborinane compound are satisfied by alkyl groups having from 1 to 6 carbon atoms, the remainder of such valences being satisfied by hydrogen, X is bromine or chlorine, Y is selected from the group consisting of hydrogen and alkyl radicals of from 1 to 12 carbon atoms, Z is selected from the group consisting of hydrogen and alkyl radicals of from 1 to 3 carbons, T is selected from the group consisting of alkyl and haloalkyl radicals of from 1 to 12 carbon atoms, and each A is selected from the group consisting of —OT and hydrocarbyl radicals which are free of aliphatic unsaturation and contain from 1 to 12 carbon atoms. Compounds of the above formula are particularly useful as preignition additives for leaded gasolines, as shown in our copending application Serial No. 800,656, filed March 20, 1959, now U. S. Patent No. 3,014,952.

*Example 1*

A 500 ml. flask equipped with a thermometer, stirrer, and a Dean-Stark trap with condenser was charged with 62.5 g. (0.6 mole) of neopentyl glycol and 24.7 g. (0.4 mole) of boric acid in 120 ml. of benzene. The mixture was heated to reflux and the water by-product removed by azeotroping with the benzene via the Dean-Stark trap. When all of the water had been removed, 65 ml. of benzene was distilled and the residual solution of triglycol diborate was cooled to 1° C.; and then 23.4 g. (0.2 mole) of boron trichloride was passed into the solution at 5°–18° C. in 0.25 hours. When the addition was complete, the solvent was removed and the residue distilled to give 75 g. (84.2% yield) of colorless 2-chloro-5,5-dimethyl-1,3,2-dioxaborinane (B.P. 50° C./1.5 mm.), and analyzing as follows:

| | Found | Calcd. for $C_5H_{10}BClO_2$ |
|---|---|---|
| Percent C | 40.66 | 40.50 |
| Percent H | 6.86 | 6.79 |
| Percent B | 7.38 | 7.31 |
| Percent Cl | 23.92 | 23.89 |

Example 2

A 137.0 g. (0.37 mole) portion of triglycol diborate (B.P. 172° C./0.15 mm.), prepared by reacting 2-methyl-2-ethyl-1,3-propanediol with boric acid, was cooled to 15° C. and treated with 45.5 g. of boron trichloride. The addition of boron trichloride was made over a period of 0.45 hour at 15°–30° C., using an ice bath for cooling. Distillation gave 173.5 g. (96.3% yield) of 2-chloro-5-methyl-5-ethyl-1,3,2-dioxaborinane, B.P. 46.5° C./0.35 mm.

Example 3

A 500 ml. flask equipped with a stirrer, thermometer, Dry Ice condenser with drying tube, and a dropping funnel was charged with 75 ml. of methylene chloride. The flask was immersed in a Dry Ice bath, and 28.3 g. (0.241 mole) of boron trichloride was condensed into the flask. Then 58.8 g. (0.241 mole) of triglycol diborate prepared from 1,3-propanediol and boric acid in 100 ml. of methylene chloride was added dropwise in 0.5 hr. at −23° to −13° C. When the addition of the triglycol diborate was complete, the mixture was allowed to warm to room temperature and then distilled to give 73.0 g. (83.8% yield) of 2-chloro-1,3,2-dioxaborinane, B.P. 30°–31° C./0.15 mm., and analyzing as follows:

|  | Found | Calcd. for $C_3H_6BClO_2$ |
| --- | --- | --- |
| Percent C | 29.98 | 29.91 |
| Percent H | 5.38 | 5.03 |
| Percent Cl | 29.28 | 29.44 |

Example 4

A 500 ml. flask was charged with 95.3 g. (0.33 mole) of the triglycol diborate prepared from 1,3-butanediol and boric acid and enough methylene chloride to wash it into the flask. Then 39.1 g. of boron trichloride was passed into the flask which was immersed in an ice-brine bath. The addition of boron trichloride took place over 0.5 hour at 3° to 10° C. Distillation of the reaction mixture gave 103 g. of 2-chloro-4-methyl-1,3,2-dioxaborinane (B.P. 42–44° C./0.8 mm.) for a yield of 76.6% and analyzing as follows:

|  | Found | Calcd. for $C_4H_8BClO_2$ |
| --- | --- | --- |
| Percent C | 35.67 | 35.78 |
| Percent H | 6.16 | 6.00 |
| Percent Cl | 27.12 | 26.40 |

Example 5

A 500 ml. flask, equipped with a stirrer, thermometer, Dry Ice condenser, and gas inlet tube, was charged with a diglycol diborate prepared by azeotropically distilling a mixture of 41.1 g. of 2,2-dimethyl-1,3-propanediol and 24.7 g. of boric acid in a benzene medium until all the water of esterification was removed. After cooling the flask to −2° C., 15.7 g. of boron trichloride was allowed to distill into the reaction flask. The addition of boron trichloride took place over a 20 minute period at 4°–9° C. When the addition of boron trichloride was completed, the mixture was heated to 70° C. to insure complete reaction. The reaction mixture was then distilled under vacuum to remove benzene. Distillation of the residue gave 37.3 g. (63% yield) of 2-chloro-5,5-dimethyl-1,3,2-dioxaborinane.

Example 6

To a 500 ml. flask containing a triglycol diborate, made by reacting 78.1 g. (0.75 mole) of 2,2-dimethyl-1,3-propanediol and 30.9 g. (0.5 mole) of boric acid in about 150 ml. of the benzene and azeotroping water of esterification, there was added dropwise 62.6 g. of boron tribromide while controlling the temperature in the flask around 10° C. After about one-half of the boron tribromide had been added, cooling was discontinued. By the end of the addition of boron tribromide the temperature was 41° C. The mixture was warmed to 55° C. to insure complete reaction and then placed under water pump vacuum to remove the benzene solvent. Upon cooling the flash to room temperature the crude product was obtained as a crystalline solid that sublimed under vacuum and had a melting point of about 50–60° C.

Example 7

A 500 ml. flask was charged with 93.1 g. (0.326 mole) of the triglycol diborate prepared from 1,3 butanediol and boric acid, and then 136.1 g. (0.652 mole) of phosphorus pentachloride were added. Addition of the phosphorus pentachloride was made in several small portions in 0.25 hour at 25–40° C. After stirring the mixture until all the solid had dissolved, the reaction mixture was placed under vacuum to remove the by-products. Distillation of the residue gave 70.3 g. (80% yield) of 2-chloro-4-methyl-1,3,2-dioxaborinane (B.P. 44–46° C./0.15 mm.).

Example 8

A 47.5 g. (0.257 mole) portion of a diglycol diborate, prepared by reacting equimolar proportions of 1,3-propanediol and boric acid, was treated with 53.6 g. (0.257 mole) of phosphorus pentachloride at 25°–45° C. over a period of 0.25 hour with cooling to control the reaction. The mixture was stirred until no further reaction was evident. Upon distillation, 30.7 g. (50% yield) of 2-chloro-1,3,2-dioxaborinane, B.P. 42–44° C./0.8–1.0 mm., was obtained.

Example 9

A 63.5 g. of (0.17 mole) portion of the triglycol diborate prepared from 2-methyl-2,4-pentanediol and boric acid was added dropwise to 20.1 g. (0.17 mole) of boron trichloride in 75 ml. of methylene chloride in 0.5 hour while controlling the temperature of the mixture between −5° to 10° C. When the addition was completed the mixture was warmed to room temperature and then the methylene chloride was removed under vacuum. Distillation of the residue gave 33.5 g. of 4,4,6-trimethyl-1,3,2-dioxaborinane (B.P. 39–40° C./0.1 mm., $n_D^{25}$ 1.4289).

We claim:

1. A process for making compounds of the formula

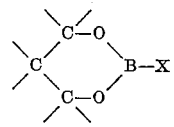

wherein X is selected from the group consisting of bromine and chlorine and each of the six indicated free valences on the three carbons in the ring are satisfied by a member of the group consisting of hydrogen and alkyl groups containing from 1 to 6 carbons, which comprises reacting a halogenating agent selected from the group consisting of boron tribromide, boron trichloride, phosphorus pentabromide, and phosphorus pentachloride with a polyglycol diborate of the type

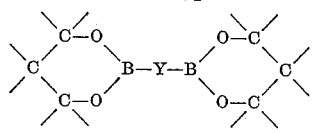

where Y is selected from the group consisting of —O— and

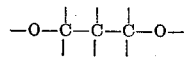

and the indicated free valences of the carbon atoms are satisfied by a member of the group consisting of hydrogen, and alkyl radicals having from 1 to 6 carbon atoms.

2. A process for making compounds of the formula

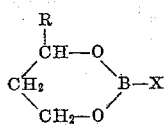

wherein X is selected from the group consisting of bromine and chlorine and R is a lower alkyl group having from 1 to 6 carbon atoms which comprises reacting a polyglycol diborate of the formula

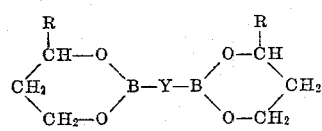

wherein Y is a member of the group consisting of —O— and

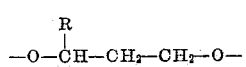

and R is as defined above, with a member of the group consisting of boron tribromide, boron trichloride, phosphorus pentabromide and phosphorus pentachloride.

3. A process for preparing compounds of the formula

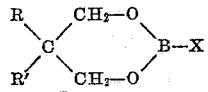

wherein X is selected from the group consisting of bromine and chlorine, and R and R' are lower alkyl groups having from 1 to 6 carbon atoms which comprises reacting a polyglycol diborate of the formula

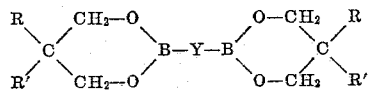

where Y is a member of the group consisting of —O—, and

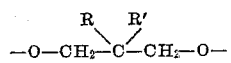

and R and R' are as defined above, with a halogenating agent selected from the group consisting of boron tribromide, boron trichloride, phosphorus pentabromide, and phosphorus pentachloride.

4. A process for making compounds of the formula

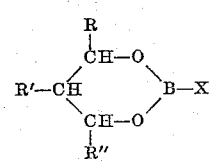

wherein X is selected from the group consisting of bromine and chlorine, and R, R', and R'' are lower alkyl radicals having from 1 to 6 carbon atoms which comprises reacting a polyglycol diborate of the formula

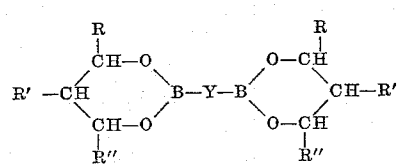

wherein Y is selected from the group consisting of —O— and

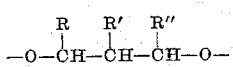

and R, R' and R'' are as defined above with a halogenating agent selected from the group consisting of boron tribromide, boron trichloride, phosphorus pentabromide, and phosphorus pentachloride.

5. A process for preparing compounds of the formula

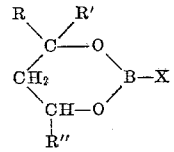

wherein X is selected from the group consisting of bromine and chlorine, and R, R' and R'' are lower alkyl radicals having from 1 to 6 carbon atoms which comprises reacting a polyglycol diborate of the formula

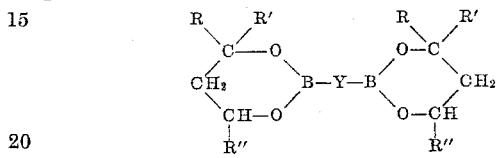

where —Y— is selected from the group consisting of —O— and

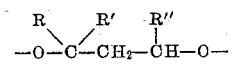

and R, R' and R'' are as defined above, with a halogenating agent selected from the group consisting of boron tribromide, boron trichloride, phosphorus pentabromide, and phosphorus pentachloride.

6. A process for preparing compounds of the formula

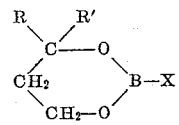

wherein X is selected from the group consisting of bromine and chlorine, and R and R' are selected from the group of lower alkyl radicals having from 1 to 6 carbon atoms which comprises reacting a polyglycol diborate of the formula

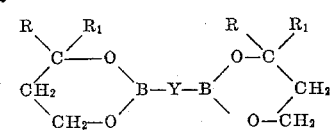

wherein —Y— is selected from the group consisting of —O— and

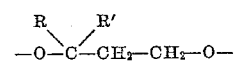

and R and R' are as defined above, with a halogenating agent selected from the group consisting of boron tribromide, boron trichloride, phosphorus pentabromide, and phosphorus pentachloride.

7. A process according to claim 1 in which all of the valences on the three carbon atoms in the ring are satisfied by hydrogen and the halogenating agent is phosphorus pentachloride.

8. A process according to claim 2 in which R is a methyl group and the halogenating agent is phosphorus pentachloride.

9. A process according to claim 3 in which R is methyl, R' is ethyl, and the halogenating agent is boron trichloride.

10. A process according to claim 3 in which R and R' are methyl groups and the halogenating agent is boron tribromide.

11. A process according to claim 5 in which R, R', and R'' are methyl groups and the halogenating agent is boron trichloride.

12. A process for preparing compounds of the formula

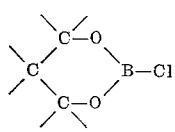

wherein each of the indicated free valences on the three carbons in the ring are satisfied by a member of the group consisting of hydrogen and alkyl radicals containing from 1 to 6 carbons, which comprises reacting boron trichloride with a triglycol diborate of the type

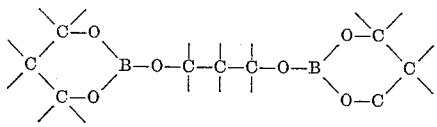

wherein each of the indicated free valences on the three carbons in the ring are satisfied as indicated above.

13. A process for preparing compounds of the formula

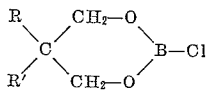

wherein R and R' are lower alkyl groups having from 1 to 6 carbon atoms, which comprises reacting boron trichloride with a triglycol diborate of the formula

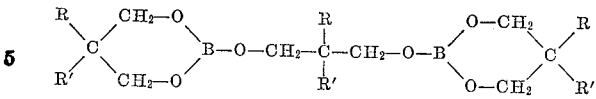

14. A process for preparing 2-chloro-5,5-dimethyl-1,3,2-dioxaborinane which comprises reacting boron trichloride with a triglycol diborate obtained by reacting boric acid with neopentyl glycol.

15. A process for preparing 2-chloro-5-methyl-5-ethyl-1,3,2-dioxaborinane which comprises reacting boron trichloride with a triglycol diborate prepared by reacting 2-methyl-2-ethyl-1,3-propanediol with boric acid.

References Cited in the file of this patent

UNITED STATES PATENTS 2,886,575     Conklin et al. _____ May 12, 1959

OTHER REFERENCES

Blau et al.: J. Chem. Soc. (London), pages 4116–4120 (1957).

Mikhailov et al.: Izvest. Akad. Nauk S SS R, Otdel Khim. Nauk, pages 1080–5 (1957).